US006850839B1

(12) United States Patent
McGibney

(10) Patent No.: US 6,850,839 B1
(45) Date of Patent: Feb. 1, 2005

(54) TIME-SENSITIVE ARTICLE TRACKING DEVICE

(75) Inventor: James A. McGibney, San Francisco, CA (US)

(73) Assignee: Sapias, Inc., San Francisco, CA (US)

( * ) Notice: Subject to any disclaimer, the term of this patent is extended or adjusted under 35 U.S.C. 154(b) by 0 days.

(21) Appl. No.: 10/302,582

(22) Filed: Nov. 21, 2002

Related U.S. Application Data

(63) Continuation-in-part of application No. 09/668,984, filed on Sep. 25, 2000, now Pat. No. 6,509,867.

(60) Provisional application No. 60/202,477, filed on May 8, 2000.

(51) Int. Cl.[7] .......................... G08B 13/14; G01C 21/00

(52) U.S. Cl. .................. 701/207; 701/213; 342/357.07; 340/539.13

(58) Field of Search ................................ 701/213, 207; 342/357.07, 357.09, 357.1, 357.17; 240/539.13, 539.14, 539.15, 539.16, 539.17; 455/456, 457; 340/573.4

(56) References Cited

U.S. PATENT DOCUMENTS 5,541,845 A * 7/1996 Klein ......................... 701/207
5,568,119 A * 10/1996 Schipper et al. ....... 340/825.37
5,731,757 A * 3/1998 Layson, Jr. .............. 340/573.1
5,742,233 A 4/1998 Hoffman et al.
5,748,084 A 5/1998 Isikoff
5,835,377 A 11/1998 Bush
5,877,724 A 3/1999 Davis
5,938,721 A * 8/1999 Dussell et al. .............. 701/211
6,014,080 A 1/2000 Layson, Jr.
6,067,018 A 5/2000 Skelton et al.
6,100,806 A 8/2000 Gaukel
6,121,922 A 9/2000 Mohan
6,140,956 A 10/2000 Hillman et al.
6,243,039 B1 6/2001 Elliot
6,362,736 B1 3/2002 Gehlot
6,363,323 B1 * 3/2002 Jones ......................... 701/213
6,397,147 B1 * 5/2002 Whitehead .................. 701/213
6,400,956 B1 * 6/2002 Richton ................... 455/456.3
6,486,801 B1 11/2002 Jones
6,492,912 B1 12/2002 Jones
6,509,830 B1 * 1/2003 Elliott .................. 340/286.02
6,510,383 B1 1/2003 Jones
6,618,668 B1 9/2003 Laird
6,683,542 B1 1/2004 Jones
6,700,507 B2 3/2004 Jones
6,714,859 B2 3/2004 Jones
6,741,927 B2 5/2004 Jones
6,748,318 B1 6/2004 Jones
6,748,320 B2 6/2004 Jones
2003/0210142 A1 * 11/2003 Freathy et al. ......... 340/539.13
2003/0212486 A1 * 11/2003 Hughes et al. .............. 701/204

FOREIGN PATENT DOCUMENTS

GB 2270405 A 3/1994

* cited by examiner

*Primary Examiner*—Michael J. Zanelli
(74) *Attorney, Agent, or Firm*—Fenwick & West LLP

(57) ABSTRACT

An article tracking device that can be attached to or otherwise located with movable and non-moveable articles has a memory that stores a subset of spatial zones and corresponding time intervals during which the spatial zones are valid. The device is adapted to periodically read the current time and its current position from the position determination system and to determine whether a spatial zone corresponding to the current time exists. If a corresponding spatial zone exists, the device determines whether its current location is within the spatial zone and performs an action in response to this determination.

20 Claims, 2 Drawing Sheets

TIME-SENSITIVE ARTICLE TRACKING DEVICE

CROSS-REFERENCE TO RELATED APPLICATIONS

This application is a continuation-in-part of U.S. patent application Ser. No. 09/668,984, filed Sep. 25, 2000, now U.S. Pat. No. 6,509,867, which claims the benefit under 35 U.S.C. § 119(e) of U.S. Provisional Application No. 60/202,477, filed May 8, 2000, and entitled "Tracking Device Which Implements GPS, Cellular and RF Signals on One Module," which is hereby incorporated by reference herein.

BACKGROUND

1. Field of the Invention

This invention pertains in general to wireless communication devices and in particular to a time-sensitive article-tracking device.

2. Background Art

With the advent of wireless technology, numerous types of tracking and locating devices have been proposed. Some of the devices utilize the global positioning system (GPS) to track and locate remote articles. These devices are adapted to use the GPS to monitor locations of remote articles and indicate whether the articles are within defined spatial zones. For example, an article-tracking device can be configured to send an automatic notification each time its associated article crosses a boundary of a spatial zone. However, the article-tracking devices do not determine whether articles are within the spatial zones at predetermined times, thereby providing limited functionality.

Therefore, there is a need in the art for an article-tracking device that is capable of automatically indicating whether an article is within a spatial zone during a predetermined time interval.

SUMMARY OF THE INVENTION

The above need is met by a time-sensitive article tracking device that can be attached to or otherwise located with movable and non-movable articles. The device has a memory that stores a subset of spatial zones and corresponding time intervals. A central server stores the full set of spatial zones/time intervals and sends a new subset of spatial zones and time intervals to the device in real time.

The device is adapted to periodically read the current time and its current position from a position determination system and determine whether a spatial zone corresponding to the current time exists. If a corresponding spatial zone exists, the device determines whether its current location is within the spatial zone, and performs an action in response to this determination.

In one embodiment, if the device is not within a spatial zone, the device sends a notification to the central server. If the device is within a spatial zone, the device does not provide any notification to the central server.

In one embodiment, the device is adapted to determine whether it is within a certain proximity of a spatial zone and to notify the central server to indicate whether the device is approaching the spatial zone. In another embodiment, the device is adapted to notify the central server to indicate whether the device is leaving the spatial zone.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Reference in the specification to "one embodiment" or "an embodiment" means that a particular feature, Structure, or characteristic described in connection with the embodiment is included in at least one embodiment of the invention. The appearances of the phrase "in one embodiment" in various places in the specification are not necessarily all referring to the same embodiment.

Figure 1:
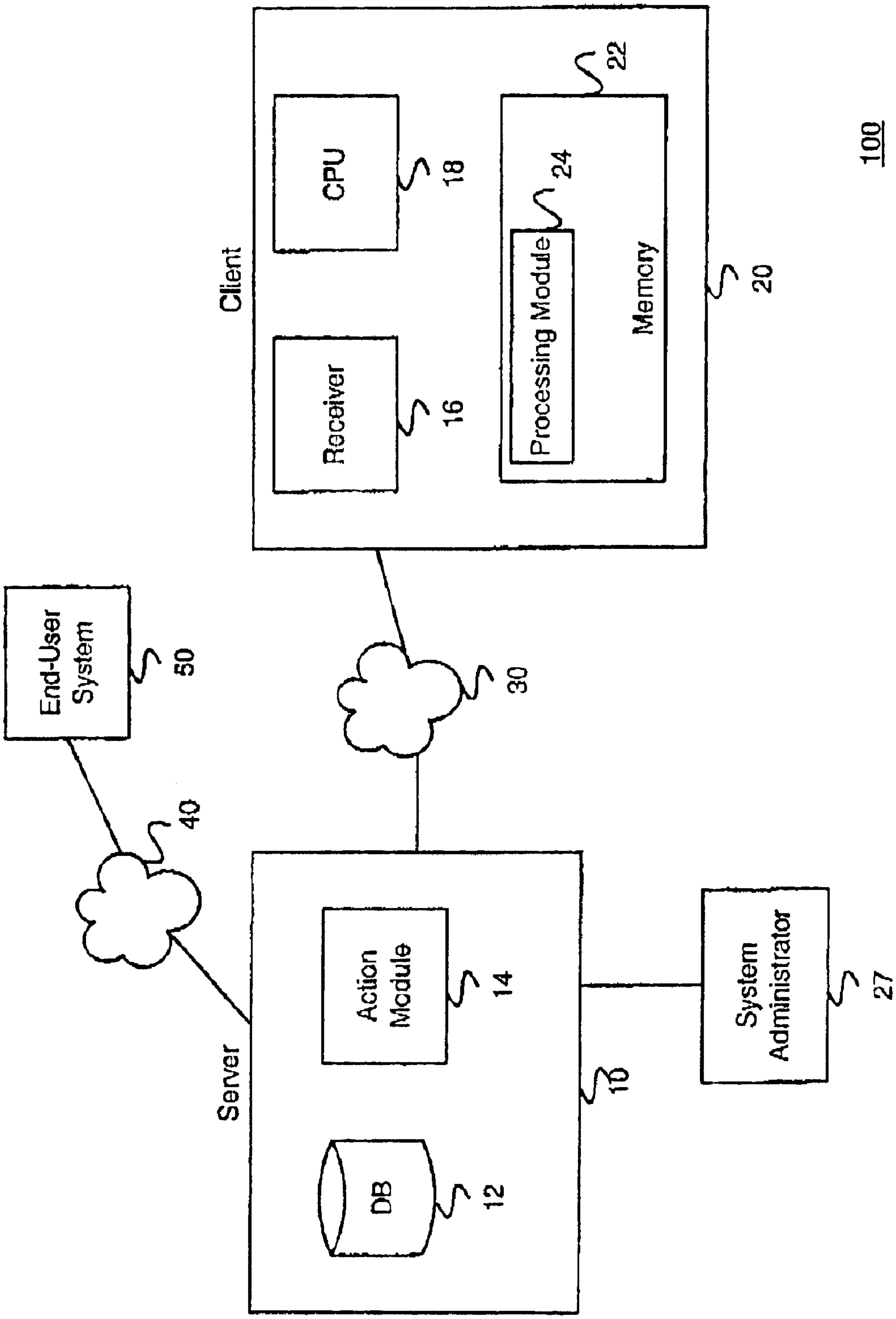
FIG. 1 is a high-level block diagram of a system according to an embodiment of the present invention.

Referring now to FIG. 1, it illustrates the components of system 100 according to an embodiment of the present invention. Multiple clients 20 are in communication with server 10 via wireless links 30. Although a typical system will have a plurality of clients 20, FIG. 1 illustrates one client 20 for purposes of clarity.

Turning now to the individual entities illustrated in FIG. 1, server 10 is preferably a conventional computer system that receives information from client 20 and performs one or more actions in response to the received information. As understood in the art, server 10 runs one or more modules. As used herein, the term "module" refers to computer program code adapted to provide the functionality attributed to the module. The program code is embodied in a random access memory (RAM), a read-only memory (ROM) or other media.

Server 10 maintains a spatial zones database 12 (referred herein as "database 12") populated with one or more records. Each record contains fields for storing data associated with the record. Each field can hold data in the form of numeric, textual, binary information, and any other data type adapted for storage in a database. In one embodiment, a record in database 12 contains a client identifier (client ID) field, a time interval field, and associated spatial zones field.

The client ID field holds one or more client IDs identifying clients to which the record pertains. In one embodiment, the client ID field holds only a single ID. In another embodiment, the client ID field holds multiple client IDs.

The spatial zone field identifies one or more spatial zones for the record. A spatial zone is a geographic area or region. A zone is preferably defined by one or more geometric constructs, such as points, lines, arcs, polygons, circles, etc. Each construct is preferably associated with a geographic location, such as a latitude and longitude, thereby establishing a geographic spatial zone. If a spatial zone is defined as a circle, for example, the spatial zone field preferably identifies the latitude and longitude of the center, and the distance of the radius. Similarly, if a spatial zone is defined by a polygon, the spatial zone field preferably stores the latitudes and longitudes of the end points of each side of the polygon.

A spatial zone can be a three-dimensional (3D) zone. If, for example, a spatial zone is defined by a sphere, the database record preferably stores a center of the sphere at a latitude, longitude, and altitude and a radius of a given distance from the center of the sphere.

The time interval field holds one or more time intervals indicating when the spatial zones in the record are valid. The time intervals specify a time or date with any desired degree of granularity. For example, time intervals can indicate a time, day, week, or a range of days. Time intervals can indicate a day of a month or a range of days of a month. For example, a time interval can indicate that client 20 should be within a spatial zone between 5 p.m. and 5:15 p.m. on Mondays.

In one embodiment, each database record also contains rules pertaining to the time intervals and associated spatial zones. The rules indicate what actions server 10 and client 20 should take in response to the determination of whether client 20 is within a spatial zone at the associated time interval or whether client 20 is approaching or leaving a spatial zone. For example, a rule can indicate that client 20 should notify server 10 to indicate whether the client 20 is within the spatial zone.

Server 10 further maintains an action engine module 14 (hereinafter referred as "action module"). Action module 14 coordinates communications between server 10 and client 20 and executes any server-side rules in the database 12. In one embodiment, action module 14 is adapted to receive a client request for a subset of database records. The request contains the client ID and criteria that server 10 uses to choose a subset of database records to send to client 20. For example, the criteria may indicate that client 20 needs all database records for the entire day and/or all of the records having spatial zones near the client's current location. Action module 14 receives the client ID, and uses it as an index to find time intervals and associated spatial zones for that client. Action module 14 uses the criteria indicated in the request to choose a subset of database records and sends the subset of database records to the client. Each sent record in the subset of records includes a time interval, corresponding spatial zones, and rules indicating actions to take in response to the determination of whether a client is within a spatial zone at the associated time interval.

In another embodiment, action module 14 modifies the database records stored by client 20 in real time based on the time and/or current location of client 20. For example, spatial zones can define stops on a scheduled route of a truck to which client 20 is attached. Database 12 stores stops and corresponding time intervals on a scheduled route for client 20 for the day. At the beginning of the day, action module 14 sends a database record with a time interval and a corresponding stop. For example, the record indicates that client 20 should be located at a first stop between 10 a.m. and 10:15 a.m. When client 20 approaches the first stop within the time interval, client 20 sends notification to server 10 indicating that the first stop has been reached. The notification also includes a client ID. Action module 14 then sends in real time a record with a next time interval and a corresponding stop that client 20 should be within the time interval. This allows server 10 to record that each stop has been reached on time, with a minimum communication with client 20. In an alternative embodiment, server 10 sends the entire day's schedule of stops at once.

Action module 14 is also adapted to receive communication from client 20 indicating whether client 20 is within a spatial zone at a specified time interval. This communication also includes a client ID.

System 100 further comprises an end user system 50. Server 10 connects to end user system 50 via a network 40. Network 40 can be the Internet, a telephone network, a cellular telephone network, a pager network, etc. Server 10 contacts end user system 50 in response to events and rules in the database 12. For example, server 10 may contact end user system 50 to indicate that client 20 is within a spatial zone at a specified time interval. Server 10 may contact end user system 50 by sending an email, sending a page, making a phone call, etc.

Server 10 and client 20 are preferably in communication via conventional communications links 30. The communications links 30 include known wireless communications media, such as communications over the cellular telephone network using protocols such as the global system for mobile communications (GSM), code division multiple access (CDMA), time division multiple access (TDMA), etc.

Client 20 is preferably an article-tracking device that can be attached to or otherwise located with an article. As used herein, an "article" is any mobile object, such as a sea borne vehicle, a road vehicle, a package, a laptop computer, a person, an animal, etc. An article can also be a traditionally non-mobile object, such as a desktop computer system, rack-mounted computer system, etc. The client 20 is adapted to determine its own location, and, therefore, the location of the article to which it is attached.

Client 20 maintains a conventional position determination receiver 16 adapted to use signals from position determination systems (not shown in FIG. 1) to determine the current position of client 20 and the current time. Examples of position determination systems used by client 20 are the conventional global positioning system (GPS), the Galileo satellite navigation system, a TV signal triangulation system, a wide area augmentation system (WAAS), and the Assisted GPS. The client 20 may determine the location of the article and communicate this information to server 10 at regular time intervals, for example, every 2 minutes, 60 minutes or day. As previously discussed, each client 20 is preferably identified by a client ID.

Client 20 further maintains a memory 22, such as a Programmable Read Only Memory (PROM) or a Random Access Memory (RAM) or a non-volatile random access memory (NVRAM). Memory 22 stores the database records received from server 10. Memory 22 also stores program modules for providing the functionality attributed to client 20. The modules stored in memory 22 preferably include a processing engine module 24 (also referred as "processing module"). Processing module 24 is adapted to read the current time and location from position determination receiver 16. Processing module 24 uses the time as an index to the subset of database records stored in memory 22 to determine if there are any time intervals that include the current time. If so, processing module 24 determines whether the current location is within the spatial zone(s) associated with the interval(s).

Processing module 24 then performs an action in response to the determination using the rules stored in memory 22. For example, if client 20 is not located within the spatial zone, processing module 24 sends a notification to server 10. The notification includes the client ID and information indicating that client 20 is not located within the spatial zone. In one embodiment, if client 20 is located within a spatial zone, processing module 24 does not notify server 10; processing module continues reading the current time and location from position determination receiver 16.

In one embodiment, processing module 24 is also adapted to determine whether client 20 is within a certain proximity from a spatial zone, approaching a spatial zone, and/or leaving a spatial zone, and sends a notification to server 10 indicating the result of the determination.

Client 20 further includes a CPU 18, which may be a microprocessor subsystem that is capable of executing modules stored in memory 22. Such a microprocessor subsystem includes, for example, a 32-bit embedded Reduced Instruction Set Computer (RISC) microprocessor manufactured by Advanced RISC Machines (ARM). The microprocessor subsystem may be a conventional integrated circuit.

System 100 further includes a system administration workstation 27 for updating records stored in database 12, including client IDs, spatial zones, time intervals, and dates. System administration workstation 27 is a conventional computer system. In one embodiment, system administration workstation 27 connects to server 10 via the Internet.

Figure 2:
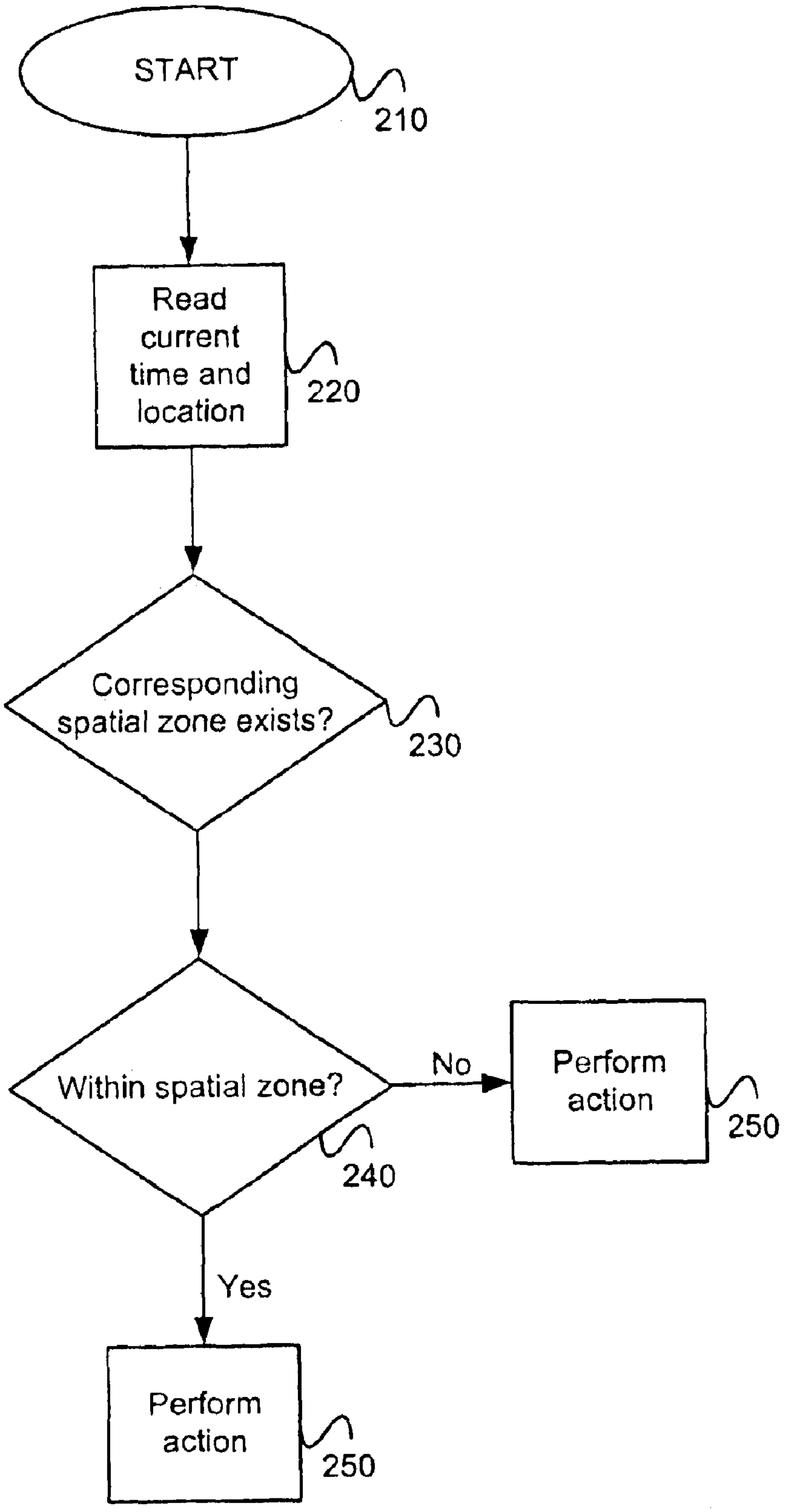
FIG. 2 is a flowchart illustrating a method of the operation of a client of the system shown in FIG. 1 according to an embodiment of the present invention.

FIG. 2 is a flowchart of one method performed by processing module 24 executed by client 20. The process starts 210 and processing module 24 reads 220 the current time and location from position determination receiver 16. Processing module 24 uses the current time as an index to the subset of database records stored in memory 22 to determine 230 if any spatial zones are currently applicable. If so, processing module 24 determines 240 whether the current location is within the zone(s).

Processing module 24 performs 250 an action responsive to the determination in step 240. In one embodiment, if client 20 is not located within a spatial zone, processing module 24 sends notification to server 10. In one embodiment, if client 20 is located within a spatial zone, processing module 24 does not notify server 10. Then, processing module 24 repeats the process and continues reading current time and location from position determination receiver 16. In another embodiment, processing module 24 sends notification to server 10 when client 20 is approaching the spatial zone and/or leaving the spatial zone.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for determining whether an article tracking device is within a spatial zone, the method comprising the steps of:

obtaining a current time and a current position of the device;

determining a spatial zone that corresponds to the current time;

determining whether the current position of the device is within the spatial zone; and sending a request to a server for a subset of server database records in response to the determination of whether the current position of the device is within the spatial zone.

2. The method of claim 1, further comprising:

notifying the server to indicate whether the device is within the spatial zone.

3. The method of claim 1, wherein the step of determining a spatial zone that corresponds to the current time further comprises:

determining a time interval that includes the current time; and determining a spatial zone that corresponds to the time interval.

4. The method of claim 1, wherein the current time and the current position of the device are obtained using a global positioning system (GPS).

5. The method of claim 1, wherein the current time and the current position of the device are obtained using an assisted global positioning system (GPS).

6. The method of claim 1, wherein the current time and the current position of the device are obtained using a triangulation system.

7. The method of claim 1, wherein the current time and the current position of the device are obtained using a wide area augmentation system (WAAS).

8. The method of claim 1, further comprising:

determining whether the device is within a proximity of the spatial zone corresponding to the current time.

9. The method of claim 1, wherein a spatial zone defines a stop in a scheduled route and wherein each stop has a corresponding time interval indicating when the device should be at the stop, the method further comprising:

determining whether the device reached a stop at a corresponding time interval; and performing an action in response to the determination.

10. The method of claim 1, further comprising:

receiving from the server database records indicating one or more spatial zones and corresponding time intervals during which the spatial zones are valid.

11. An article tracking device comprising:

a position determination receiver, the receiver for receiving signals that enable a determination of a current time and a current position of the device;

a memory communicatively coupled to the receiver, the memory for storing a plurality of database records, each database record comprising spatial zones and corresponding time intervals associated with the spatial zones; and a processing module for obtaining the current time and the current position of the device from the receiver, determining a spatial zone that corresponds to the current time, determining whether the device is within the spatial zone, and sending a request to a server for a subset of database records held by the server in response to the determination of whether the device is within the spatial zone.

12. The article tracking device of claim 11, wherein each database record stores rules and wherein the processing module performs an action in response to the rules.

13. The article tracking device of claim 11, wherein the processing module is further adapted to notify the server to indicate whether the device is within the spatial zone.

14. The article tracking device of claim 11, wherein the processing module is further adapted to notify the server to indicate whether the device is approaching the spatial zone.

15. A server system for communicating with an article tracking device, the system comprising:

a spatial zones database for storing a plurality of records, each database record comprising time intervals and spatial zones associated with the time intervals; and an action module for interfacing with the article tracking device, for receiving a request from the article tracking device for a subset of the records stored in the database, and for sending to the device at least the subset of the records stored in the database.

16. The server system of claim 15, wherein the action module is further adapted to receive a notification from the article tracking device indicating whether the device is within a spatial zone within the associated time interval.

17. The server system of claim 15, wherein the request includes an identifier of the article tracking device and criteria that the action module should use to choose the subset of the records and wherein the action module uses the identifier and the criteria to choose the subset of the records.

18. The server system of claim 15 further adapted to contact an end user system in response to receiving a notification from the article tracking device.

19. The server system of claim 15, wherein each database record stores rules indicating actions that the server system should take in response to communication from the article tracking device.

20. The server system of claim 15, wherein each database record stores rules indicating actions that the article tracking device should take in response to location of the article tracking device.

* * * * *